Figure 1:
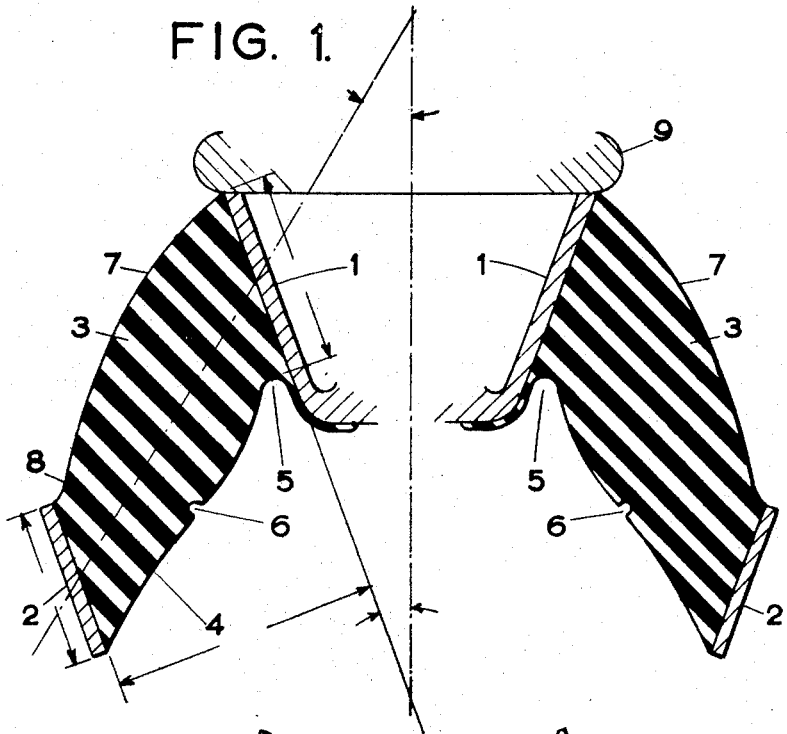

Oct. 28, 1958 — A. E. MOULTON — 2,858,127
RUBBER SPRINGS
Filed June 14, 1954 — 5 Sheets-Sheet 1

Inventor
ALEXANDER ERIC MOULTON
By Shoemaker & Mattare
Attorneys

Oct. 28, 1958     A. E. MOULTON     2,858,127
RUBBER SPRINGS

Filed June 14, 1954     5 Sheets-Sheet 2

Inventor
ALEXANDER ERIC MOULTON
By Shoemaker & Mattare
Attorneys

Oct. 28, 1958 A. E. MOULTON 2,858,127
RUBBER SPRINGS
Filed June 14, 1954 5 Sheets-Sheet 3
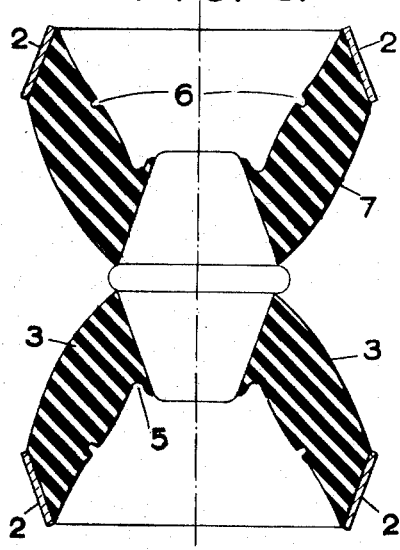
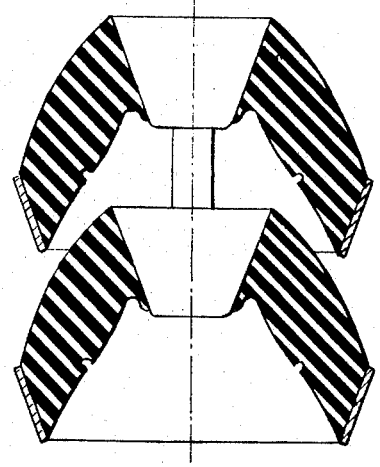
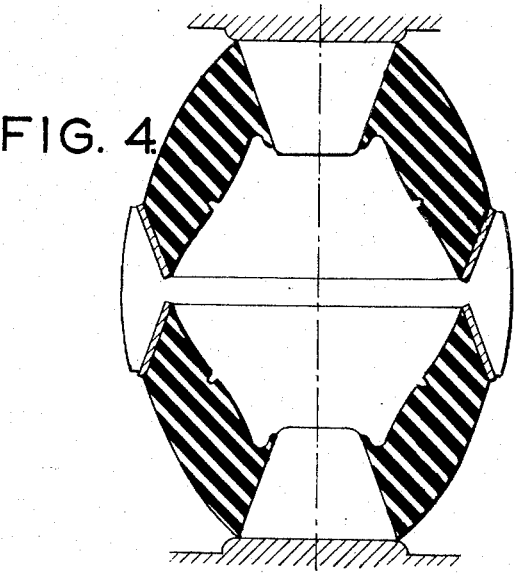
Inventor
ALEXANDER ERIC MOULTON
By Shoemaker & Mattare
Attorneys

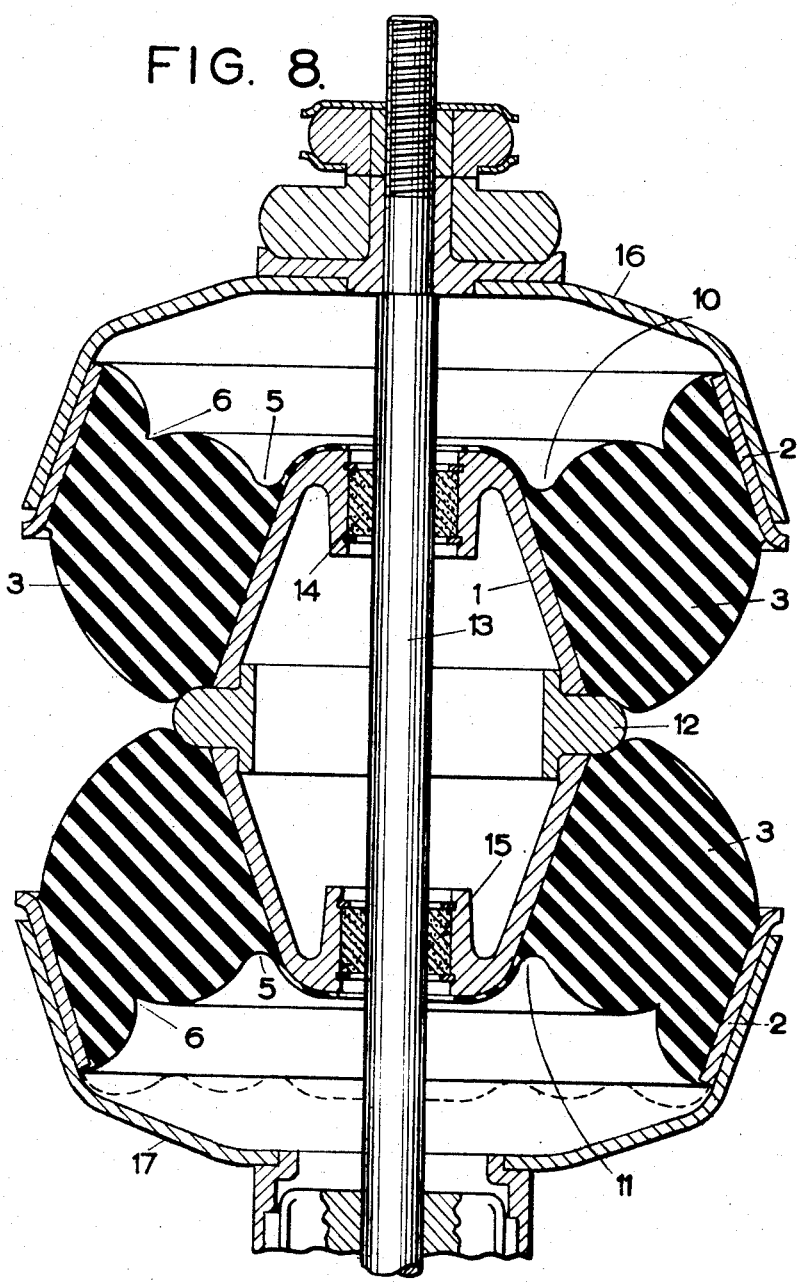

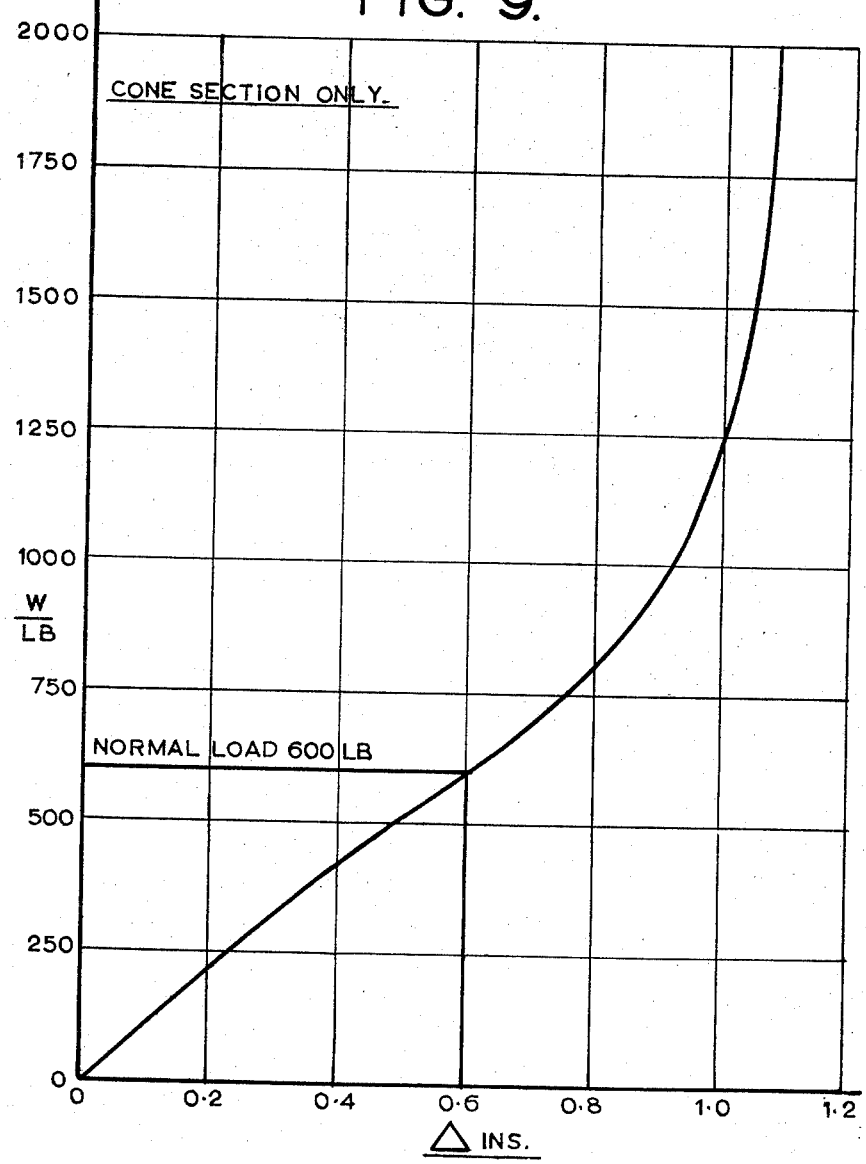

United States Patent Office 2,858,127
Patented Oct. 28, 1958

2,858,127
RUBBER SPRINGS

Alexander Eric Moulton, Bradford-on-Avon, England

Application June 14, 1954, Serial No. 436,568

2 Claims. (Cl. 267—63)

This invention relates to rubber springs and has more especial reference to those employing inclined bonded rubber and metal sandwiches where the rubber is used partly in shear and partly in compression, the relative proportions of which are determined by the angle of inclination to the line of action of the load.

The present invention has for its principal object to provide improved spring constructions and arrangements of this character in which by the reduction or elimination of end effects due to the use of continuous rubber sections and the reduction or elimination of metallic contacts which could cause abrasion, a high fatigue life and a high energy density or safe energy input per unit volume of resilient material may be achieved.

A further object of the invention is to provide a spring unit which shall be compact both in relation to the load carried per unit of cross section and in relation to the stroke compared with the overall height and which shall at the same time be of suitable shape to ensure satisfactory bonding.

Broadly stated, the improved spring unit according to the invention is of general frusto-conical form being a solid of revolution generated from an inclined bonded rubber and metal sandwich, of which the rubber tapers in the opposite direction to the cone so that the stress throughout the bonded faces is substantially uniform.

A spring unit of the same general kind as referred to in the preceding paragraph can be produced according to this invention in strip form or in the form of a ring. In such cases the form of the spring unit would be generated by projecting two oppositely inclined bonded rubber and metal sandwiches in a linear direction in the case of a strip unit and to produce a circle in the case of a ring.

In spring units of this form the upper oppositely inclined metal surfaces may be formed as a single trough like member being appropriately a metal pressing or stamping.

A column of such spring units may be built up on an axial guide in the case of rings, or without an axial guide by spot-welding or rivetting together the metal members or washers of superposed sandwich units.

The strip form and ring form units may also be appropriately stacked either with or without locating means.

The cone angle or the angle at which the metal surfaces are disposed to the median plane or central vertical axis of the unit is the controlling parameter in designing springs of this character since increasing the angle increases the compression component and decreases the shear component, and vice versa, the angle normally ranging from 20° to 45°.

It has been found however that by selecting an angle of 20° to 35° comparable energy densities both in compression and shear are obtained.

In a spring unit according to one embodiment of this invention, therefore, an annular body of rubber is bonded to substantially conical inner and outer metal surfaces having equal semi cone angles of between 20° and 35° and in order that approximately equal shear stresses shall obtain on the inner and outer bonded metal surfaces the axial length of the inner conical metal surface is greater than the axial length of the outer conical metal surface. It has also been found that where the ratio of the perpendicular distance between the inner and outer metal cone surfaces to the mean axial lengths of such surfaces does not exceed a value of 1.7 and preferably lies between 1.3 and 1.7 a spring of low rate in relation to its diameter is provided.

To provide a compact spring of high stability in which deformation in the rubber body is of the most advantageous type the angle between the axis of the spring unit and the median line of the rubber section lies between 25° and 45°.

Figure 7:
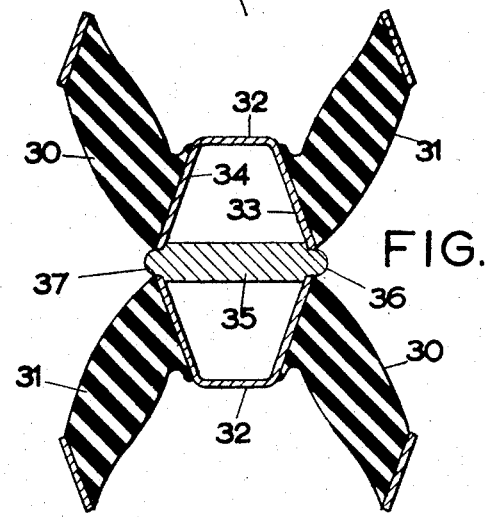
Figure 2:
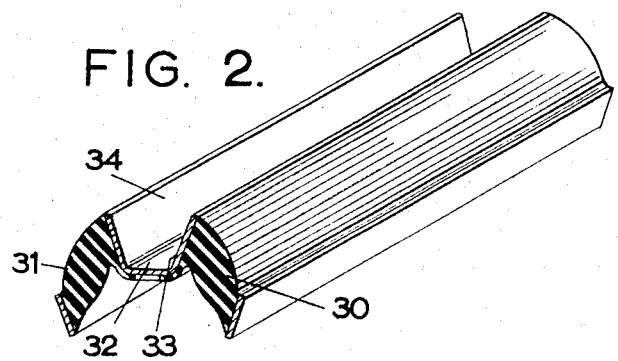
Figure 3:
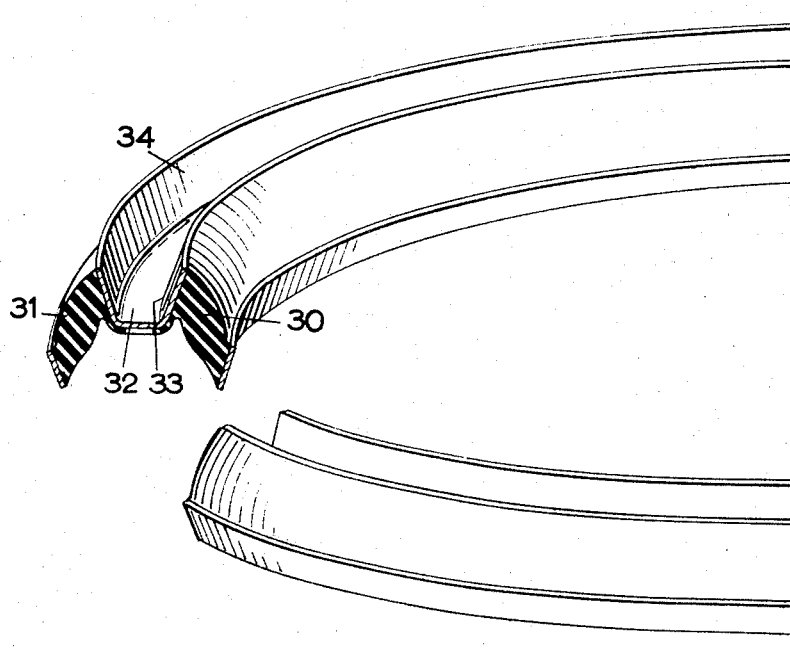

The invention will be further described with reference to the accompanying drawings which are given merely by way of example and in which Figure 1 is a sectional view showing the frusto-conical spring unit according to this invention. Figures 2 and 3 illustrate the strip form and ring form spring units according to this invention. Figures 4, 5 and 6 show alternative methods of stacking the frusto conical spring units illustrated in Figure 1 to form a spring member. While Figure 7 illustrates one method of stacking the strip and ring form units illustrated in Figures 2 and 3. Figure 8 being a view to a larger scale showing a preferred form of spring according to this invention utilising units as illustrated in Figure 1 and Figure 9 shows a typical load deflection curve appropriate to the spring unit according to this invention.

Referring now to the drawings but first more particularly to Figure 1 the rubber spring unit comprises substantially conical inner and outer metal plates 1 and 2 to which are bonded an annular body of rubber 3 the inner surface 4 of which is of general S formation. An annular recess 5 is provided adjacent the inner metal conical plate 2 so proportioned as to reduce or substantially eliminate tensile stresses at the surface of the rubber when the spring is under load. Owing to the shape of the surface of the rubber element an internal cusp is developed when the spring is under load and to enhance the stability of the spring and to ensure a symmetrical deformation, an annular groove 6 is provided which determines the position of this internal cusp.

The outer surface 7 of the rubber body is generally of convex form having an area 8 adjacent the outer conical metal member of concave curvature an abutment member 9 being provided adjacent the inner conical metal member against which the rubber body at this position bears when the spring unit is under load.

In the spring units illustrated in Figures 2 and 3 it will be noted that the two half units 30 and 31 are appropriately connected at their upper ends by a trough shaped member 32 the walls 33 and 34 of which form the inner metal surfaces to which the rubber body is bonded.

The rubber spring units can be stacked in several different ways to form a spring, Figures 4, 5 and 6 showing in outline examples in which two units of the kind illustrated in Figure 1 are stacked in series with bases abutting (Figure 4); two units stacked in series with the apices abutting (Figure 5) and two units stacked in series base to apex (Figure 6).

In Figure 7 which illustrates two strip or ring form units of the kind illustrated in Figures 2 and 3 stacked in series with their apices abutting any apropriate form of intermediate abutment member may be utilised. In the example illustrated for example a plate 35 is provided located between the juxtaposed trough shaped members 32, the projecting end portions 36 and 37 of such plate serving as abutment surfaces for the rubber at the junction of the outer surfaces of the rubber and the open ends of the trough member when the spring in under load.

It will be noted that no guiding means is illustrated as spring units according to this invention when stacked in units of two are quite stable when subjected to normal deflections. It will be appreciated, however, that guiding means such as an axial rod or other appropriate guiding means can be provided if desired, especially in cases of extreme deflections.

Turning now to the embodiment of spring illustrated in Figure 8 which shows in greater detail the arrangement illustrated diagrammatically in Figure 3 but with the spring under load.

The embodiment of spring shown in this figure comprises two spring units generally designated 10 and 11 arranged with their apices in contact. An abutment member 12 separates the two units and serves to avoid an excessive shear angle at the junction of the outer surface of the rubber element with the inner metal cone.

In the embodiment illustrated guiding means consisting of a rod 13 is provided, such rod which is preferably chromium plated extending axially through bushes 14 and 15 appropriately carbon bushes, provided in the inner conical metal members.

End abutment plates 16 and 17 are advantageously provided surrounding the outer metal conical members and passing the axial guide rod.

A typical load deflection curve is illustrated in Figure 9 which shows a rising rate as opposed to a linear rate. It will be noted that the spring exhibits a slightly falling characteristic up to the normal load position but thereafter a continual rising characteristic is exhibited.

In any of the arrangements described the bonded faces may be such that on sections taken through the sandwiches the lines representing metal surfaces in contact with the rubber are straight or convex.

By the present invention, there are provided improved arrangements of rubber spring which may be self guiding and which has a rising rate load-deflection characteristic and also a high equivalent static deflection in relation to the vertical height occupied.

Fatigue testing has shown moreover that the life of springs made according to this invention is very long and that eventual failure takes place in the centre of the rubber body, and not at the surfaces.

What I claim is:

1. A rubber spring unit of general frusto conical form being a solid of revolution generated from an inclined bonded rubber and metal sandwich of which the metal/rubber bonded interfaces are conical and the section of the rubber tapers from the inner interface toward the outer interface so that the mean stress on the inner bonded surface is substantially equal to the mean stress on the outer bonded surface and wherein a metal abutment surface is provided adjacent to the junction of the outer free surface of the rubber element with the inner metal interface for supporting the rubber element on deformation, the ratio of the perpendicular distance between the metal and the rubber bonded interfaces and the mean thickness of the rubber between its free surface lies between 1.7 and 1.3, one inner surface of the rubber element being of general S formation, the outer free surface of the rubber element being of general convex form.

2. A rubber spring unit as defined in claim 1 wherein the angle between the axis of the spring unit and median line of the section of the rubber element lies between 25° and 45°.

References Cited in the file of this patent

UNITED STATES PATENTS

| | | |
|---|---|---|
| 1,901,945 | Avery | Mar. 21, 1933 |
| 2,068,279 | Piron | Jan. 19, 1937 |
| 2,241,138 | Julien | May 6, 1941 |
| 2,327,113 | Krotz | Aug. 17, 1943 |
| 2,367,830 | Kubaugh | Jan. 23, 1945 |
| 2,482,488 | Julien | Sept. 20, 1949 |
| 2,655,005 | Kinneman | Oct. 13, 1953 |
| 2,692,057 | Dentler | Oct. 19, 1954 |

FOREIGN PATENTS

| | | |
|---|---|---|
| 884,677 | France | May 3, 1943 |
| 243,652 | Switzerland | July 31, 1946 |
| 590,765 | Great Britain | July 28, 1947 |
| 706,558 | Great Britain | Mar. 31, 1954 |